(12) United States Patent
Miscopein et al.

(10) Patent No.: US 7,362,743 B2
(45) Date of Patent: Apr. 22, 2008

(54) METHOD AND SYSTEM FOR RECEIVING AN ULTRA-WIDEBAND SIGNAL WITH A SELF-ADAPTING NUMBER OF PROPAGATION PATHS

(75) Inventors: Benoit Miscopein, Grenoble (FR); Jean Schwoerer, Grenoble (FR); Eric Batut, Gimont (FR)

(73) Assignee: France Telecom, Paris (FR)

( * ) Notice: Subject to any disclaimer, the term of this patent is extended or adjusted under 35 U.S.C. 154(b) by 302 days.

(21) Appl. No.: 10/539,631

(22) PCT Filed: Dec. 15, 2003

(86) PCT No.: PCT/FR03/03724

§ 371 (c)(1),
(2), (4) Date: Jun. 16, 2005

(87) PCT Pub. No.: WO2004/066517

PCT Pub. Date: Aug. 5, 2004

(65) Prior Publication Data

US 2006/0154630 A1    Jul. 13, 2006

(30) Foreign Application Priority Data

Dec. 17, 2002   (FR) .................................. 02 16027

(51) Int. Cl.
*H04J 3/06* (2006.01)

(52) U.S. Cl. ...................... 370/350; 455/41.2; 375/354

(58) Field of Classification Search ............... 455/41.2, 455/41.3, 42; 375/219, 259, 354, 364, 368; 370/350, 345

See application file for complete search history.

(56) References Cited

U.S. PATENT DOCUMENTS 6,810,087 B2 * 10/2004 Hoctor et al. ............... 375/259
6,967,993 B1 * 11/2005 Miller ......................... 375/150
2004/0105515 A1 * 6/2004 Mo et al. ..................... 375/354
2005/0041725 A1 * 2/2005 De Rivaz et al. ........... 375/150

FOREIGN PATENT DOCUMENTS

WO    WO 01/76086    10/2001

OTHER PUBLICATIONS

Tero Ojanpera, Ramjee Prasad: "Wideband CDMA For Third Generation Mobile Communications"; Artech House, USA XP002260449, p. 46-p. 47.

* cited by examiner

*Primary Examiner*—Edward F. Urban
*Assistant Examiner*—Christian A. Hannon
(74) *Attorney, Agent, or Firm*—Young & Thompson

(57) ABSTRACT

A method and a system for receiving an ultra-wideband signal with a self-adapting number of propagation paths. The transmitted signal includes, over a symbol time, a series of direct successive modulated pulses which propagate along a direct propagation path and secondary pulses which are associated with each direct pulse and which each propagate along a secondary propagation path. The method includes: receiving the series of direct and secondary pulses on the same receiver circuit; creating a composite correlation pattern, including a series of elementary patterns which are time-shifted in relation to a first elementary correlation pattern; calculating the value of the global correlation coefficient between each direct pulse which is associated with the plurality of secondary pulses and the composite correlation pattern, in order to obtain a global correlation value of the symbol, sum of the cross-correlation coefficients of each of the direct and secondary pulses.

20 Claims, 7 Drawing Sheets

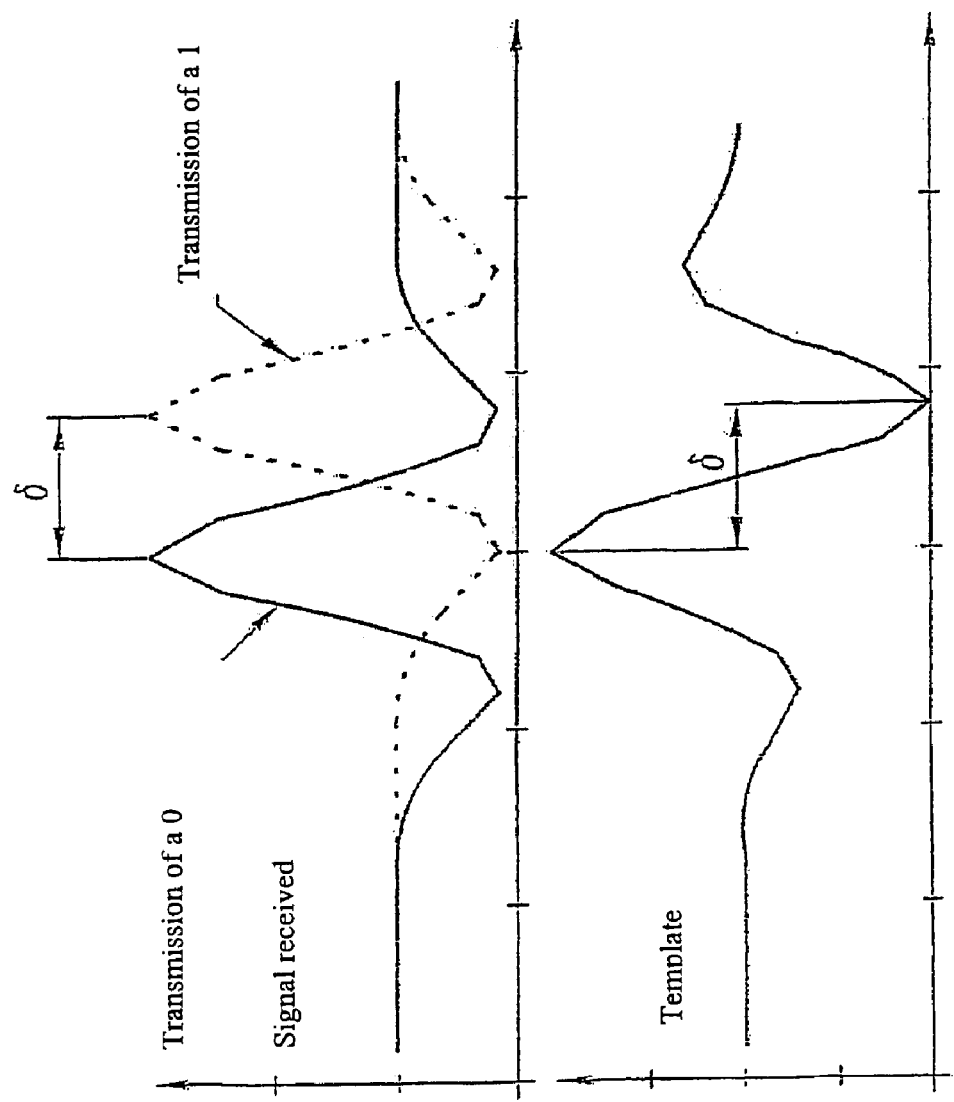

User 1: pseudo code 1, 3, 7

User 2: pseudo code 5, 4, 1

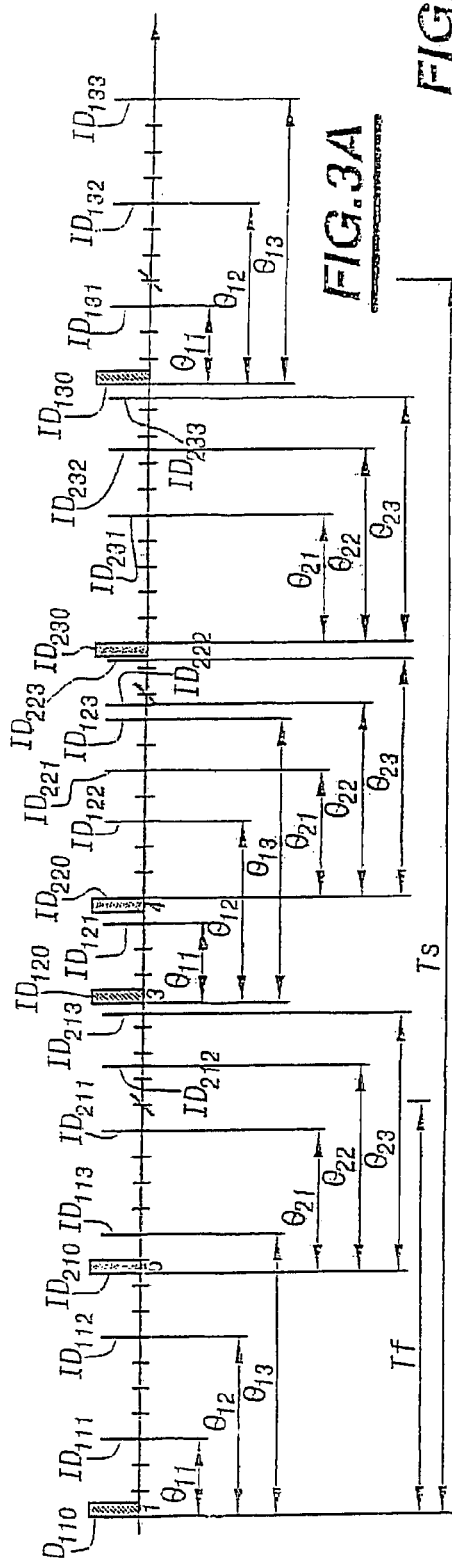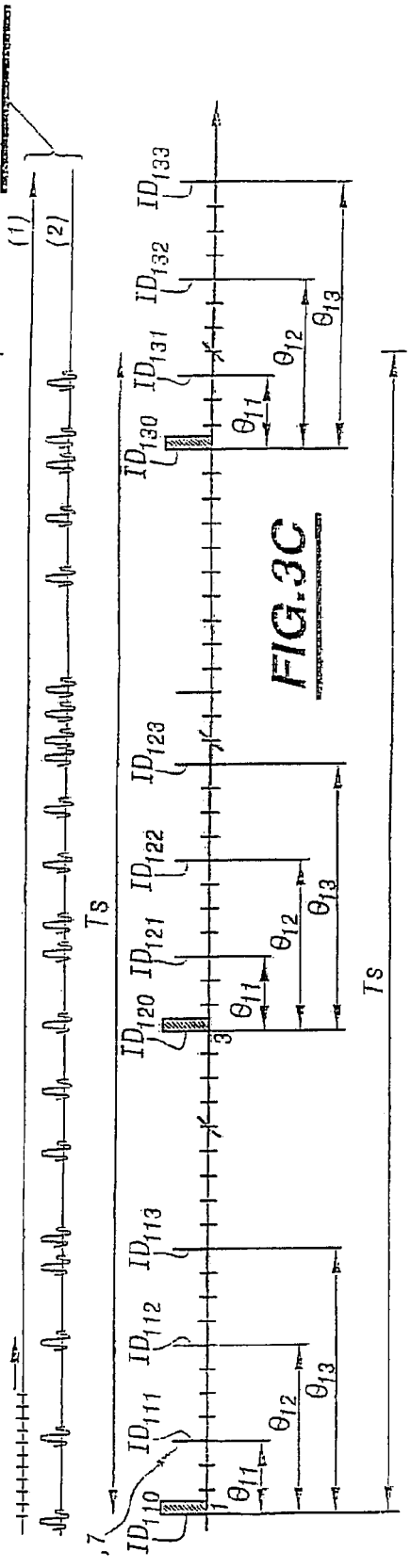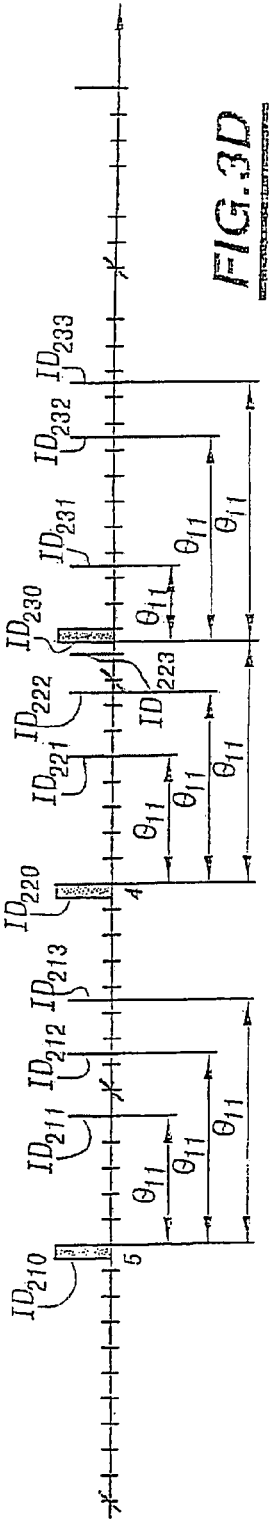

METHOD AND SYSTEM FOR RECEIVING AN ULTRA-WIDEBAND SIGNAL WITH A SELF-ADAPTING NUMBER OF PROPAGATION PATHS

BACKGROUND OF THE INVENTION

1. Field of the Invention

The invention relates to a method and system for receiving an ultra-wideband signal with a self-adapting number of propagation paths.

2. Description of the Related Art

The technique of radio communications using an ultra-wideband signal, also referred to as UWB in English, does not use a carrier frequency. Instead of modulating a signal or supporting carrier wave, the information to be transmitted is transmitted directly in baseband, using support pulses having a very short duration of less than one nanosecond, and therefore a very large bandwidth of several GHz.

Since these pulses are transmitted at low power, the spectral density of the power of the transmitted signal is consequently very low.

A UWB signal is thus not a continuous signal, but instead a sequence of very brief pulses having a very low cyclical ratio.

Multiple access to the transmission by a signal of this type is conventionally carried out by means of time leaps (Time Hopping) controlled by a pseudo random sequence. The signal may be modulated in terms of amplitude by the form factor or even the delay of the successive pulses.

In contrast with the concepts of the basic techniques which use a carrier wave, the techniques for transmitting and receiving UWB signals are the only techniques of this kind and are similar to the techniques for detecting spectrum spreading signals.

In particular, the "comb-type" receivers for UWB signals are designed to operate in environments with interference in which the topology of the location in which they are used produces complex transmission channels which are variable or slowly variable owing to numerous multiple secondary propagation paths, and prevents, in practice, the existence of a propagation path which is directly visible.

To this end, the receivers for UWB signals known from the prior art thus conventionally have a structure referred to as being of the "comb-type" which is derived from those used for the receivers of spectrum spreading signals.

As illustrated in FIG. 1A, the UWB receivers mentioned above comprise a branch for receiving via a comb "member", each receiving branch processing a given receiving path. The outlet of each of the receiving branches is recombined, after weighting, $\alpha_1$, $\alpha_j$, $\alpha_N$, in accordance with the strategy pursued by the designer of the receiver.

In order to ensure correct operation of the receiver, it is necessary to allocate one of the receiving branches for searching for new secondary and/or principal propagation paths for pulses. For a "comb-type" UWB receiver having "N" members or paths, it is therefore necessary to provide N+1 receiving branches.

As also shown in FIG. 1B, in the case of a comb-type UWB receiver, a receiving branch is constituted by an analogue correlator, a correlation pattern generator and an analogue integrator. The tracking of the path relative to the receiving branch in question is brought about by the control logic of the receiver.

When the comb-type UWB receiver is synchronised, the control logic of the receiver brings about the production of a pattern corresponding to the arrival times of a pulse. That produces a correlation pattern configured in order to have a high intercorrelation value with the pulse received and an intercorrelation value of zero in the presence of white noise. A high intermediate intercorrelation value indicates the presence of a direct or secondary pulse.

FIG. 1C illustrates, by way of example, an example of this principle in the case of a 2-PPM digital modulation, the transmission of binary values 0 and 1 being illustrated by the transmission of two pulses A and B which are staggered over time.

The correlation pattern is configured so that the value of the intercorrelation coefficient is positive in the presence of a non-staggered pulse (A) corresponding to the transmission of a zero value, but negative in the presence of a staggered pulse (B) corresponding to the transmission of a value one, and zero when there are no pulses. The correlation pattern is thus symmetrical relative to a centre of symmetry.

However, since a symbol is most often coded over several pulses, it is necessary to integrate the values obtained for the intercorrelation coefficient for each pulse relative to the same symbol and, in this manner, to obtain a global correlation coefficient value for the symbol. This value is transmitted to the control logic of the receiver in order to be interpreted at that location in accordance with the coding method used and thus to find the symbol transmitted.

Another specific example illustrated in the case of a PPM modulation with two simultaneous users each having a pseudo random sequence is illustrated in FIG. 1D. In this example, the symbol is repeated three times, each user therefore transmitting three pulses which represent the same symbol. Consequently, the symbol time $T_s$ is divided into three frames Tf in which each user codes a single unique pulse.

The location of this pulse in the frame $T_f$ is fixed relative to elemental frame intervals by the value of the pseudo random sequence belonging to each user. Finally, each pulse is staggered by a length of time $\delta$ relative to the start of each elemental frame interval when the binary transmission illustrated is that of the value 1 instead of the value 0, when there is no staggering operation.

The comb-type UWB receivers mentioned above involve an excessively high level of complexity since each additional member presupposes the integration of an additional receiving branch. Consequently, there is a relatively strict limit on the number of members that a receiver of this type can have in view of the constraints in terms of integration, spatial requirement, cost and consumption.

In practice, it is rare to be able to have a comb-type UWB receiver having more than 4 members, that is five operational receiving branches.

Receivers of this type are therefore limited to high-level uses in which the criterion of cost is secondary compared with that of overall effectiveness in terms of connection quality.

Comb-type UWB receiver solutions which are completely digital have been envisaged, in which the signal received is directly digitised at the output of the antenna. Although, owing to the purely software-based processing of the above-mentioned digitised signal, the structure of receivers of this type no longer corresponds to the traditional comb-type architecture, solutions of this type are not currently viable since current analogue/digital converters are not suitable for a use of this type, and the digital processing operations which are to be carried out on the above-mentioned digital signals cannot be carried out in real time by the current digital signal processors.

SUMMARY OF THE INVENTION

The object of the present invention is to overcome all of the disadvantages of the prior art in using comb-type UWB signal receivers.

In particular, one aspect of the present invention is the use of a method and system for receiving an ultra-wideband UWB signal whose physical architecture is significantly simplified compared with that of the comb-type UWB receivers from the prior art.

Another aspect of the present invention is the use of a method and system for receiving a UWB signal by means of which the operational costs are substantially reduced owing to the above-mentioned simplification.

Another aspect of the present invention is the use of a method and system for receiving an ultra-wideband signal by means of which, in spite of the significant simplification of the structure used, a significantly improved quality of connection and overall effectiveness is achieved, owing to the absence of physical limitation of the number of principal and secondary propagation paths effectively processed.

Finally, another aspect of the present invention, owing to the absence of physical limitation of the number of effective principal and secondary paths mentioned above, is the use of a method and system for receiving an ultra-wideband signal with a self-adapting number of effectively processed propagation paths, which allows the quality of the radio connection between the transmitter and the receiver to be optimised, even in the presence of a transmission channel originating from a harsh and variable environment.

The method and system for UWB reception to which the present invention relates are used for the radio connection of all types of domestic or professional equipment, in particular in an environment which corresponds to a channel for transmission by radio/microwave means which is variable or subjected to a great deal of interference.

BRIEF DESCRIPTION OF THE DRAWINGS

They will be better understood from a reading of the description and examination of the Figures below, in which, in addition to FIGS. 1A to 1D relating to the prior art:

FIGS. 3A to 3D illustrate, purely by way of example, timing diagrams for the detection of symbols which are transmitted along multiple paths, based on a composite correlation pattern, in accordance with the method to which the present invention relates, in the case where the transmission is carried out, by way of non-limiting example, in 2-PPM mode, the direct and secondary pulses which are propagated along a direct and secondary path being taken into account;

DETAILED DESCRIPTION OF THE PREFERRED EMBODIMENT

A more detailed description of the method and system for receiving an ultra-wideband signal, according to the subject-matter of the present invention, will now be given with reference to FIG. 2 and the following Figures.

Generally, it should be noted that the process for transmission of the ultra-wideband signal corresponds to that previously described with reference to FIGS. 1A to 1D, the receiving method to which the invention relates allowing, under these conditions, a series of modulated successive direct pulses to be received over a symbol time $T_s$, each pulse being propagated along at least one direct propagation path, with which series a plurality of separate successive secondary pulses are associated, each being propagated along a secondary propagation path separate from the direct propagation path.

It should be appreciated in particular under these conditions that each direct pulse corresponds to the shortest propagation time, each separate successive secondary pulse associated with the above-mentioned direct pulse then being successively staggered over time relative to the time at which the direct pulse is received with which the secondary pulses are associated.

The direct and secondary propagation paths provide no indication at all of the number of reflections of the corresponding pulse which is propagated over these paths. However, the separate successive secondary pulses are produced by a significantly increasing number of reflections, each reflection being the source of attenuation, and the separate successive secondary pulses are considered to have an amplitude or energy which decreases substantially in accordance with the order of reception thereof.

Figure 1A:
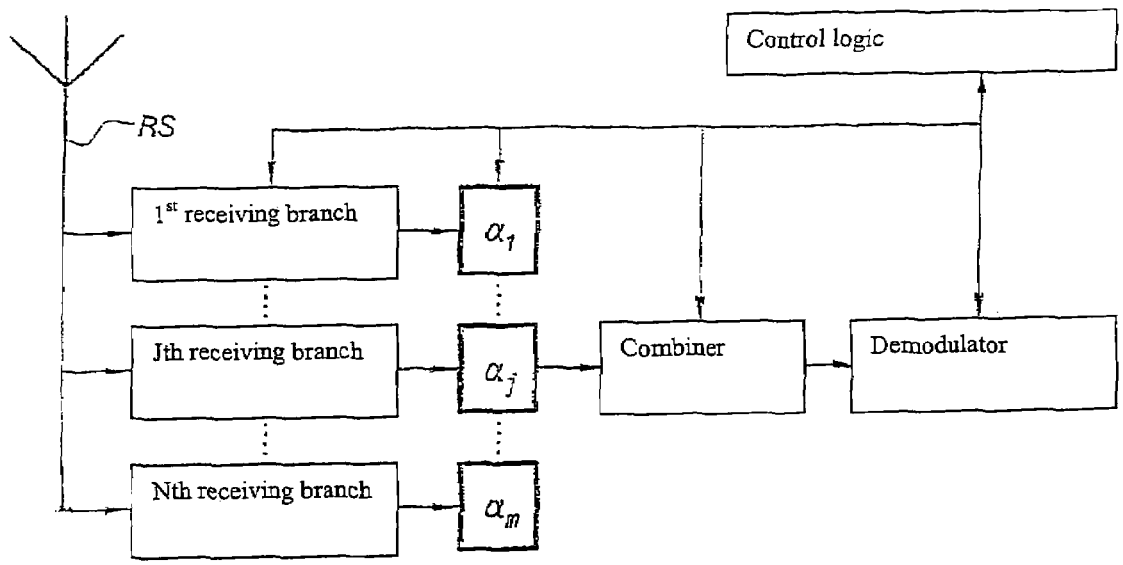
Figure 1B:
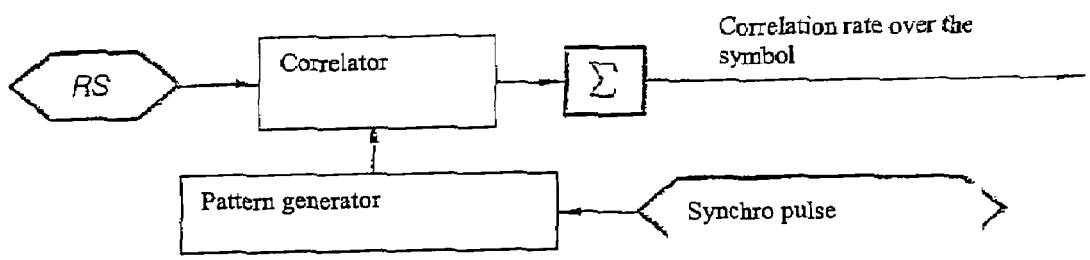
Figure 1D:
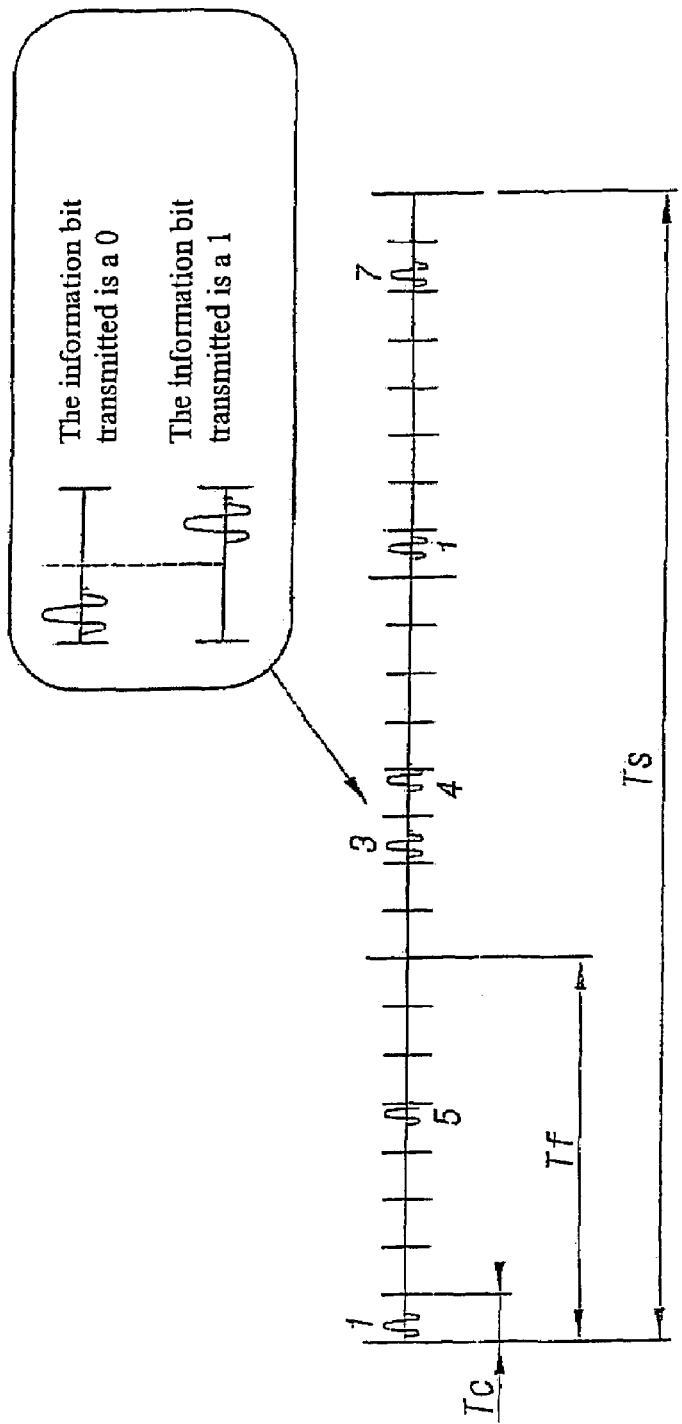

Consequently, the transmission of pulses $ID_{ij}$ was considered, these pulses corresponding, for example, to the transmitted pulses as illustrated in FIG. 1D when the modulation is, for example, of the type 2-PPM. In the notation above, the subscript i refers to the user 1 or 2, in the case of FIG. 1D, and the subscript j refers to the order of the pulse transmitted in each frame $T_f$ in accordance with the pseudo random code allocated to each user.

By way of non-limiting example and in order to simplify the description, the pseudo random code is considered which is allocated to each of the users i=1, i=2 in FIG. 1D corresponding successively to the constituent frames of the symbol time, the pseudo random code for each user mentioned above being j=1, 3, 7 for user 1, then j=5, 4, 1 for user 2, respectively.

The time staggering δ is the same as in the case of FIG. 1D for reasons of simplification.

Figure 2:
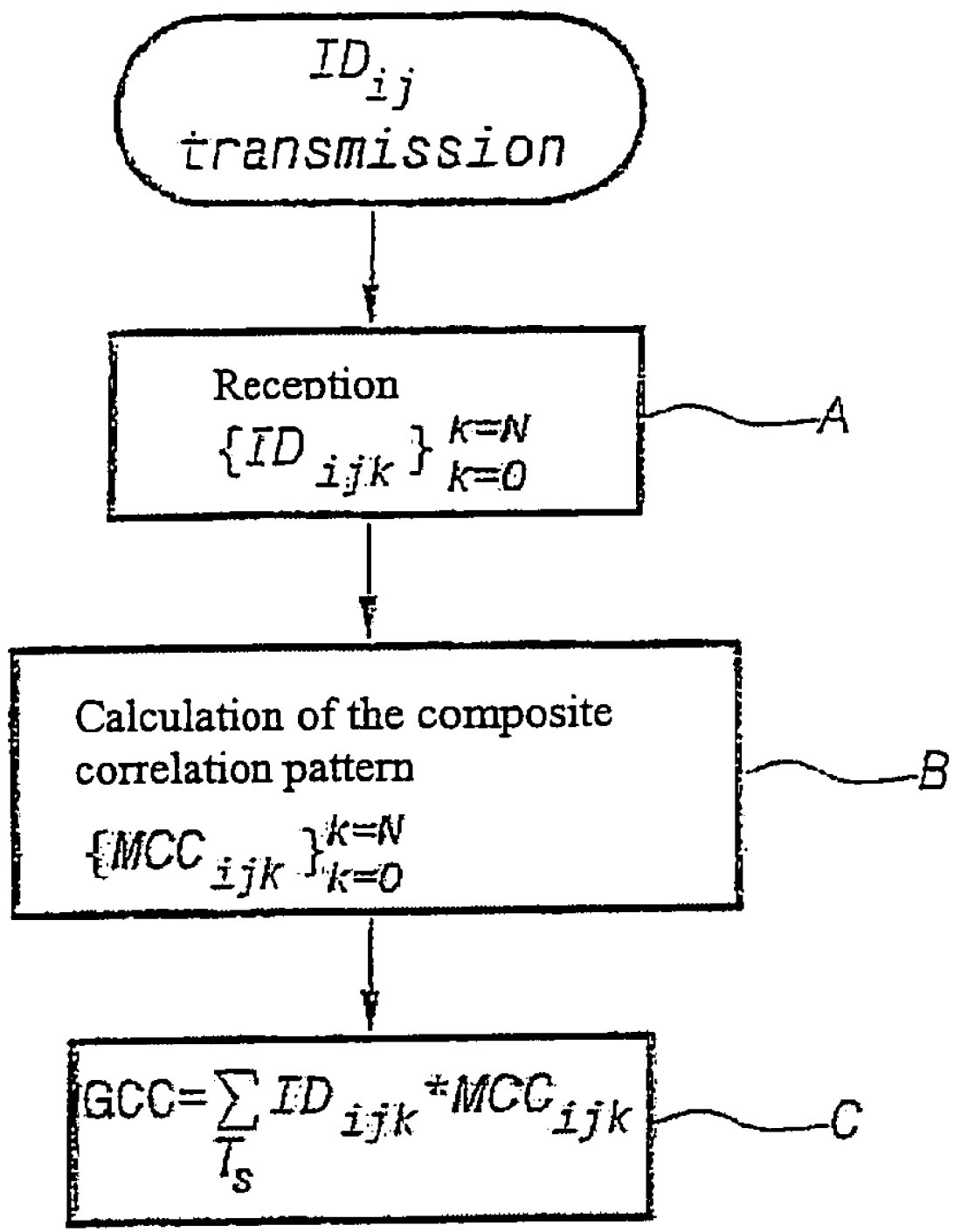
FIG. 2 is, by way of example, a flow chart of the steps necessary for carrying out the method to which the present invention relates.

With reference to FIG. 2, the method to which the invention relates then consists in receiving, in a step A, the series of modulated successive direct pulses and the plurality of secondary pulses associated with each of the modulated successive direct pulses on the same receiving circuit.

Under these conditions, the series of direct pulses and associated secondary pulses is designated:

$$-\{ID_{ijk}\}_{k=0}^{k=0}$$

In this notation, i and j represent the user reference, and the frame reference in the symbol time $T_s$, respectively, and k represents the order of the received pulse, direct pulse and/or secondary pulse.

Conventionally, it has been shown that the order of the direct pulse, in each frame $T_f$, is arbitrarily taken to be equal to 0, that is k=0, the successive separate secondary pulses of the order k=1 to N, for example.

The receiving step A is then followed by a step B which consists in producing, by means of calculation, a composite correlation pattern which is constituted by a series of elemental correlation patterns.

Generally, it has been shown that each elemental correlation pattern corresponds, in the non-limiting example of the 2-PPM modulation, to the signal referred to as the template, which is illustrated in FIG. 1C.

More precisely, it has been shown that the series of elemental correlation patterns comprises a first elemental correlation pattern which is associated with each direct pulse, that is to say, with any pulse which corresponds in terms of position in each frame $T_f$ to the position given by the pseudo random code allocated to each user and, of course, successive elemental correlation patterns which are each associated with a successive secondary pulse of the order k, k∈[1,N].

Of course, the successive elemental correlation patterns associated with each secondary pulse are staggered over time relative to the first elemental correlation pattern which is associated with the direct pulse by a value corresponding to the difference in the propagation time between, on the one hand, the propagation time of the direct pulse of the order k=0 on the direct propagation path, and, on the other hand, the propagation time of the associated secondary pulse having a successive order k∈[1,N] on the corresponding secondary propagation path.

With reference to FIG. 2, in step B, the composite correlation pattern is referred to by the notation:

$$-\{MCC_{ijk}\}_{k=0}^{k=N}$$

In order to produce the composite correlation pattern mentioned above, by way of non-limiting example, all of the direct and secondary pulses received over a symbol time are detected by means of sliding correlation. It has been found that the calculation carried out in this manner over a symbol time can then be used for the following symbol time owing to the fact that, over a symbol time, or if necessary, over two consecutive symbol times, the transmission channel is considered to be substantially invariable. The process for carrying out and calculating the composite correlation pattern will be described in greater detail in the description.

Step B is then followed by step C which consists in calculating the value of the global intercorrelation coefficient between each direct pulse associated with the plurality of secondary pulses and the composite correlation pattern.

In step C of FIG. 2, this operation is designated:

$$-GCC = \sum_{T_s} ID_{ijk} * MCC_{ijk}$$

In the relationship above, it is indicated that GCC designates the value of the global intercorrelation coefficient obtained between each direct pulse associated with the plurality of secondary pulses and the composite correlation pattern mentioned above.

It is indicated that the value of the global intecorrelation coefficient GGC is thus constituted by the sum of the intercorrelation coefficients of each of the direct and secondary pulses obtained for each of the modulated pulses transmitted for the same symbol and represents a global correlation value for the symbol transmitted for each user.

The operation for calculating the global intercorrelation coefficient thus comprises, with reference to step C of FIG. 2, the calculation of the elemental intercorrelation coefficient between each elemental intercorrelation pattern and the direct or secondary pulse associated with each of the elemental intercorrelation patterns, then the integration, over the symbol time $T_s$, of all the elemental intercorrelation coefficient values.

An illustration of the implementation of steps A, B and C illustrated in FIG. 2 will now be given with reference to the pulse timing diagrams illustrated in FIGS. 3A, 3B, 3C, and 3D.

FIG. 3A illustrates the series of modulated successive direct pulses and secondary pulses associated with each of the direct pulses in the non-limiting example of FIG. 1D.

The direct pulses of the order k=0 produced for the users 1 and 2 are illustrated differently by means of hatching and points, the secondary pulses of the order k>1 being limited to k=3 so as not to excessively complicate the drawing.

It should be appreciated, in particular, that the position of the secondary pulses, such as $ID_{111}$ to $ID_{113}$, can be any position relative to any subsequent direct pulse k=0.

Under these conditions, the time staggering $\theta_{11}$, $\theta_{12}$, $\theta_{13}$, and $\theta_{21}$, $\theta_{22}$, $\theta_{23}$ for each secondary pulse associated with the corresponding direct pulse is repeated over each successive frame interval $T_f$ without any change with reference to the above-mentioned convention.

In this manner, the composite correlation pattern as illustrated in FIG. 3B can be produced in the following manner:
  locking of each elemental correlation pattern on each direct pulse of the order k=0;
  calculating the intercorrelation coefficient for successive elemental correlation patterns produced, for example, at time intervals which correspond to the time resolution of a constituent template for each elemental correlation pattern, as illustrated in FIG. 1C;
  selecting only the successive elemental correlation patterns whose intercorrelation product is greater than a threshold value, for example, in order to constitute the composite correlation pattern, as illustrated in FIG. 3B.

It should be appreciated, under these conditions, that the composite correlation pattern mentioned above is constituted substantially by elemental correlation patterns produced at the time when not only the direct pulses of the order k=0 appear, but also the secondary pulses of the order k>1 for which the intercorrelation coefficient with an elemental correlation pattern is greater than the above-mentioned threshold value.

The process for calculating the value of the global intercorrelation coefficient GCC is then carried out, as illustrated in FIG. 3C then 3D, for each user and, of course, for the direct pulses and the secondary pulses associated therewith based on the composite correlation pattern illustrated in FIG. 3B and the succession of pulses mentioned above.

Generally, it is indicated that, whilst the synchronisation of the composite correlation pattern is carried out substantially over a symbol time, based on direct pulses and, of course, pseudo random codes allocated to each user, the discrimination of the order of the secondary pulses is not indispensable, only the position of these pulses in a symbol time $T_s$ ultimately being taken into consideration.

The method to which the present invention relates thus appears particularly remarkable in that the number of pulses which are finally retained in order to ensure the calculation operation for the composite correlation pattern, then the value of the global intercorrelation coefficient can be high and readily selected, for example, at a number of 10 secondary pulses for each direct pulse in accordance with the characteristics for use and for carrying out the method to which the invention relates.

In particular, the selection of the number of pulses retained can be guided by considerations relating to either the level of amplitude and/or energy of the secondary pulses or, more simply, to the effective number of retained pulses.

In this manner, for a countable group of direct and secondary pulses, taking into account the time discrimination of two successive pulses, the method to which the invention relates can consist in retaining the first N paths, the first N paths mentioned above comprising the direct path of the order k=0, which corresponds to the shortest propagation time for the associated modulated pulse, and N−1 secondary paths which each correspond to a propagation time for a secondary pulse which increases successively.

In this solution, with reference to FIGS. 3A and 3B, it is indicated that the number of secondary pulses retained may consist in discriminating any direct pulse from the same frame and retaining the secondary pulses which are between two successive direct pulses or even three successive direct pulses. The number of secondary pulses retained in this manner allows the first N paths to be defined and retained.

Another possibility for selecting the number of secondary pulses may consist, for the countable group of direct pulses and secondary pulses taken-into consideration, in retaining N paths for which the amplitude or the energy of the direct pulse or secondary pulses is at a maximum.

An operating method of this type consists, of course, in addition to discriminating the amplitudes or energy of direct pulses of the order k=0 which are considered as maximum values, in discriminating the secondary pulses in accordance with the amplitude and/or energy thereof in order to retain the N pulses having the best amplitude and/or energy.

However, it should be appreciated that discrimination using only the number N of secondary pulses associated with a direct pulse is likely to be found to be less effective with regard to the implementation of the method to which the invention relates than discrimination using a criterion of amplitude and/or energy of the above-mentioned pulses.

In any case, the number N of paths retained may be adapted either in accordance with a selection criterion of the first N paths in order to carry out more rapid processing, or, conversely, in accordance with a selection criterion of N paths which correspond to a maximum amplitude and/or energy of the direct pulse and the secondary pulses in accordance with the propagation conditions. An operating method of this type thus allows the quality of the connection via ultra-wideband signal to be optimised.

With regard to the operation for calculating the composite correlation pattern, as illustrated in the timing diagram in FIG. 3B, it is indicated that this process consists in establishing, by means of correlation over at least one symbol time $T_s$, an image of the transmission channel in terms of direct pulses or secondary pulses, of the propagation time and the difference in propagation time between successive direct pulses and secondary pulses, then updating, by means of sliding correlation, the image of the transmission channel in order to update the appearance and disappearance of the secondary propagation paths, if necessary, direct propagation paths, and to establish, over at least one symbol time, the composite correlation pattern as an updated image of the transmission channel.

A more detailed description of a system for receiving an ultra-wideband signal which is representative of the symbols, to which the present invention relates, will now be given with reference to FIGS. 4A and 4B.

Figure 4A:
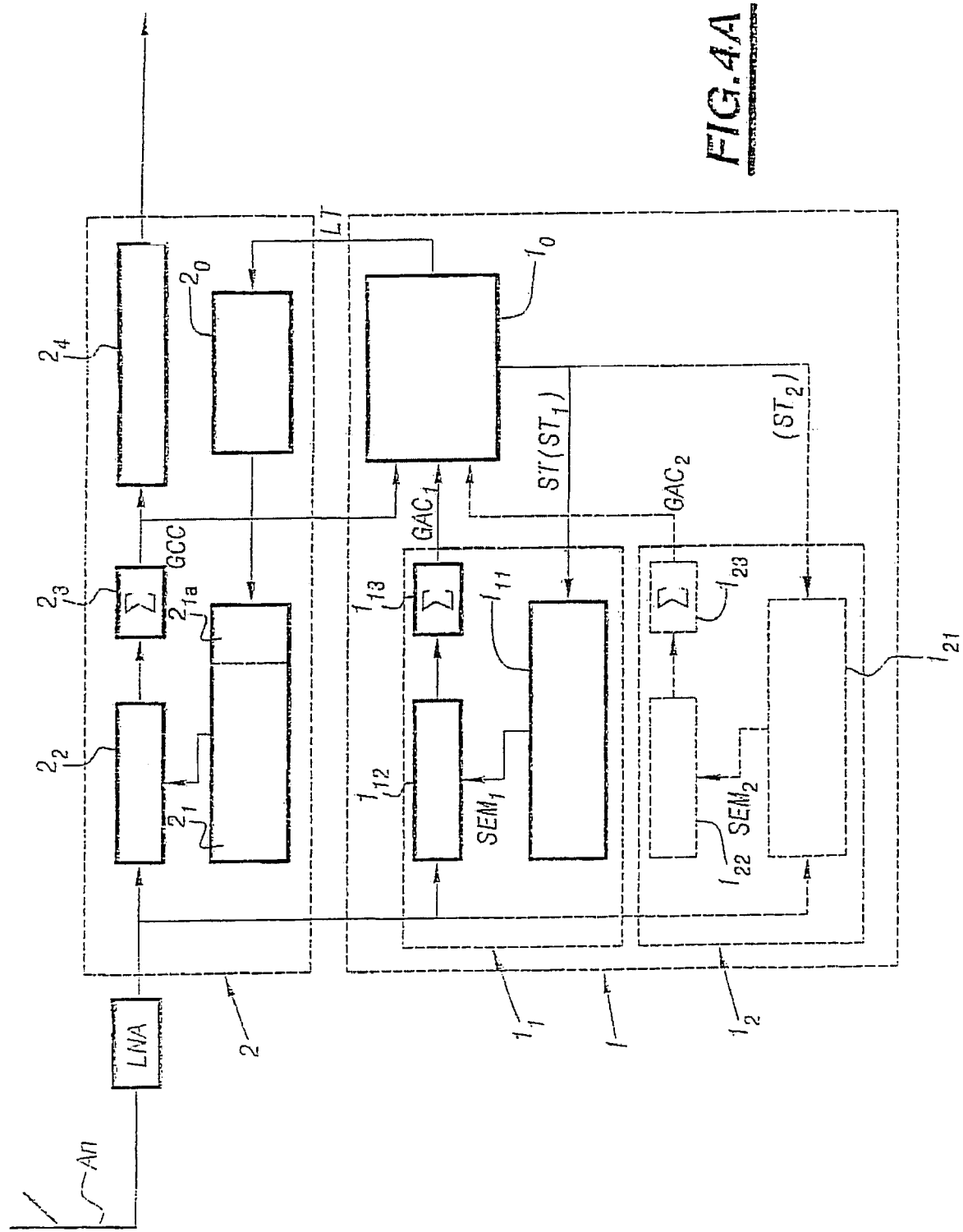
FIG. 4A illustrates, purely by way of example, the operational diagram, in the form of block diagrams, of a system for receiving a UWB signal having a self-adapting number of propagation paths, in accordance with the subject-matter of the present invention.

As illustrated in FIG. 4A above, the system to which the invention relates comprises common receiving circuits for the series of modulated successive pulses, direct pulses of the order k=0 and secondary pulses of the order k>0.

By way of non-limiting example, the common receiving circuits comprise an antenna $A_n$ and a low-noise amplifier LNA which constitutes an antenna amplifier.

They further comprise a means 1 for acquiring and updating, over at least one symbol time $T_s$, an image of the transmission channel in terms of direct pulses or secondary pulses, of the propagation time and the difference in propagation time between successive direct pulses and secondary pulses.

As mentioned above with regard to the method to which the invention relates, the acquisition and updating means 1 allows the appearance and disappearance of secondary propagation paths and the principal propagation path to be updated by means of sliding correlation, and, of course, a composite correlation pattern to be established over at least one symbol time, this being the pattern $\{MCC_{ijk}\}_{k=0}^{k=N}$ mentioned above in the description.

As illustrated in FIG. 4A, the acquisition and updating means 1 allows a path list signal representing the image of the transmission channel to be transmitted, the path list being designated LT in FIG. 4, this list being transmitted, for example, for each symbol time $T_s$.

By way of non-limiting example, it is indicated that the path list signal may correspond to the designation of the times, over the symbol time, at which each elemental correlation pattern must be successively brought about in order to produce the above-mentioned composite correlation pattern $\{MCC_{ijk}\}_{k=0}^{k=N}$.

In the same manner as the composite correlation pattern $\{MCC_{ijk}\}_{k=0}^{k=N}$, it is indicated that the times designated by the path list signal LT are, of course, staggered over time relative to the time of the first elemental correlation pattern associated with each direct pulse by the difference in propagation time between the propagation time of the direct pulse over the direct propagation path and the propagation time of the associated secondary pulse which is propagated over the corresponding secondary propagation path.

Furthermore, the system to which the present invention relates comprises a single correlation means 2 which receives the path list signal for direct and secondary propagation paths LT, the single correlation means 2 allowing the value to be calculated for the global intercorrelation coefficient GCC between each direct pulse associated with the plurality of secondary pulses and the composite correlation pattern $\{MCC_{ijk}\}_{k=0}^{k=N}$.

A more detailed description of the acquisition and updating means 1 will now be given below, with reference to the same FIG. 4A.

According to a first embodiment, the acquisition and updating means 1 mentioned above comprises a global acquisition and tracking correlation means, which is designated $1_1$ and which receives the series of successive pulses transmitted by the common receiving circuits and which transmits a global acquisition correlation coefficient value designated $GAC_1$.

More precisely, it is indicated that, in a similar manner to the devices of the prior art, as illustrated in FIG. 1B, the global acquisition correlation means $1_1$ comprises a correlator $1_{12}$, an integrator or summing integrator $1_{13}$ and a generator $1_{11}$ for an elemental synchronisation pattern $SEM_1$.

The acquisition and updating means 1 further comprises a channel scanning and tracking module $1_0$ which receives the global acquisition correlation coefficient value $GAC_1$ transmitted by the global acquisition and tracking correlation means $1_1$, mentioned above, as well as the global intercorrelation coefficient value GCC transmitted by the single correlation means 2.

The channel scanning and tracking module $1_0$ transmits the list of direct and secondary propagation paths LT, described above in the description with regard to the implementation of the method to which the invention relates, and a synchronisation signal $ST_1$ over the symbol time, to the elemental synchronisation pattern generator $1_{11}$, which constitutes the acquisition and updating means $1_1$.

In particular, the synchronisation signal $ST_1$ corresponds to the timing diagram illustrated in FIG. 3B in position (1).

Under these conditions, the elemental synchronisation pattern generator $1_{11}$ transmits, after acquisition of the image of the channel by means of sliding correlation, a group of elemental synchronisation patterns $SEM_1$ which forms an acquisition correlation pattern which substantially corresponds to the existence of an elemental correlation pattern produced at the time at which the existence of each direct pulse or secondary pulses associated therewith can be predicted, in the absence of any significant variability of the transmission channel.

For a more detailed description of a process of acquisition and tracking by means of sliding correlation, reference can advantageously be made to the article entitled "Rapid Acquisition for Ultra-Wideband Localizers", by Robert Fleming, Cherie Kushner, Gary Roberts, Uday Nandiwada, AEther Wire & Location, Inc., for example. The above-mentioned article is available at the Internet site http://www.aetherwire.com By way of non-limiting example, it is indicated that the synchronisation signal $ST_1$ is, of course, synchronised over the symbol time.

To this end, the channel scanning and tracking module $1_0$ may, based on the pseudo random codes of each of the users, and therefore the position of the direct pulses produced by each of them, then based on the path list LT, produce a synchronisation signal $ST_1$, as described above in the description.

In one production variant, the selection of the times at which the elemental synchronisation patterns are created, as illustrated in position (2) of FIG. 3B, can be carried out based on the pseudo random codes held by the elemental synchronisation pattern generator $1_{11}$, the synchronisation signal $ST_1$ then being reduced to a series of successive equidistant pulses which constitute a time base, for example, the equidistant pulses being separated by a time period which corresponds to the discrimination resolution of two successive direct and/or secondary pulses. These pulses are repeated at each symbol time $T_s$.

It will thus be appreciated that the signal illustrated in FIG. 3B in position (2) corresponds to an acquisition correlation pattern transmitted by the elemental synchronisation pattern generator $1_{11}$ to the correlator $1_{22}$ of the global acquisition correlation means.

The operating method mentioned above allows the path list signal LT to be updated by means of sliding correlation for the following symbol time based on the global correlation coefficient value GCC transmitted by the single correlation means for the preceding symbol time, in accordance with the appearance and/or disappearance of direct and secondary propagation paths in accordance with the variability of the transmission channel.

It should be appreciated in particular that, in the steady state, that is to say, when the transmission channel is not variable, the path list signal LT is substantially invariable from one symbol time to another.

Conversely, when a secondary pulse disappears or appears, for example, the acquisition correlation pattern transmitted to the correlator $1_{12}$ is modified as well as, of course, the corresponding global correlation coefficient value $GAC_1$.

Comparison of the correlation coefficient values GCC and $GAC_1$ therefore allows the modification of the acquisition correlation pattern to be retained and, of course, the path list signal LT to be updated for the following symbol time in order to ultimately allow the correlation process for the single correlation means 2 to be updated.

In any case, it should be appreciated that, after the channel has been established in a position of equilibrium, that is to say, when the channel is not variable, the path list signal LT transmitted by the channel scanning and tracking module is formed by the composite correlation times with the series of successive pulses received, for which the global intercorrelation coefficient value GCC transmitted by the single correlation means is at a maximum.

With regard to the single correlation means, it is indicated, as illustrated in FIG. 4A, that this comprises, in a similar manner to the global acquisition correlation means, a correlator $2_2$ which receives the series of successive pulses from the common receiving circuits, an integrator or summing integrator $2_3$ allowing the global correlation coefficient value GCC to be calculated based on the elemental correlation values transmitted by the correlator $2_2$ and a symbol decision circuit $2_4$ which receives the global correlation coefficient value GCC.

Furthermore, the single correlation means 2 comprises a reception control circuit $2_0$ which receives the path list signal LT described above, and an elemental correlation pattern generator $2_1$ which receives the signal transmitted by the reception control module $2_0$. The elemental correlation pattern generator $2_1$ transmits the composite correlation pattern $2_1$ as illustrated at point (2) of FIG. 3B.

With regard to the reception control module $2_0$, it is indicated that the module, based on the path list signal LT, allows a series of trigger pulses to be transmitted which correspond to the correlation times defined above in the description. The series of pulses obtained in this manner allows the composite correlation pattern to be produced, as illustrated for example, at point (2) of FIG. 3B, based on elemental correlation patterns produced for each trigger pulse transmitted by the reception and control module $2_0$.

Finally, in one variant for using the device to which the present invention relates, it is indicated that, as illustrated in FIG. 4A, the device may comprise a plurality of global acquisition and tracking correlation means, the means $1_1$ described above and $1_2$ being illustrated with dotted lines. The global acquisition and tracking correlation means is/are identical to the means $1_1$ described above and, for this reason, has/have similar references, $1_{22}$ for the correlator, $1_{23}$ for the integrator or summing integrator, $1_{21}$ for the elemental synchronisation pattern generator, $SEM_2$ for the elemental synchronisation patterns.

Two or more global acquisition and tracking correlation means may be provided, the channel scanning and tracking module $1_0$ being common to all the means mentioned above.

In a situation of this type, the channel scanning and tracking module $1_0$ receives the value of the corresponding global acquisition correlation coefficients designated $GAC_1$, $GAC_2$ in FIG. 4A, but instead transmits a plurality of synchronisation signals $ST_1$, $ST_2$ as set out in the above-mentioned Figure.

In this manner, each global acquisition and tracking correlation means $1_1$, $1_2$, and of subsequent order, comprises an elemental synchronisation pattern generator $1_{11}$ and $1_{21}$ which is associated therewith. Each of these receives a specific correlation time list signal transmitted by the channel scanning and tracking module $1_0$, that is to say, the signals $ST_1$ and $ST_2$ and subsequent ones. These signals may advantageously correspond to time segments which are staggered, such as the frame segments, for example, these segments being successive and complementary. This allows a series of successive elemental synchronisation correlation patterns to be produced by means of complementary successive segments of time, by means of sliding correlation, and, in this manner, allows the time for acquisition of the image of the transmission channel to be divided by the number of global acquisition and tracking correlation means which constitute the plurality of global acquisition and tracking correlation means.

The operating method of the system to which the invention relates, as illustrated in FIG. 4A, can therefore be illustrated by FIG. 4B in the following manner.

When the connection is established, an initialisation step 100 is called, in which the receiving system illustrated in FIG. 4A is initialised, in particular, for example, the calculation values are all reset to zero.

Step 100 is followed, once initialisation is complete, by step 101 for probing the channel and searching for synchronisation by means of sliding correlation, as mentioned above in the description. This step is carried out, as described above in the description, based on the pseudo random codes used for each of the users and, of course, the position of the pulses received, transmitted and therefore received, taking into account the pseudo random code mentioned above. The appearance of a main correlation peak allows the receiving system to which the invention relates to be synchronised, as illustrated in FIG. 4A, on the transmitter, by detecting and marking the principal path following the detection of the position of each principal pulse. In this situation, the secondary correlation peaks, which indicate the existence of secondary propagation paths, are then detected and the value of the global correlation coefficient GCC and the global acquisition correlation coefficient GAC are then updated as a result.

The channel scanning and tracking module $1_0$ then allows the paths to be processed to be identified, and optionally a weighting coefficient to be assigned to them, in the same manner as for the devices from the prior art, and the respective propagation time to be noted as mentioned above in the description for the successive pulses.

It should be noted that, in accordance with a specific operational method for the method and system to which the present invention relates, the selection of the paths may be carried out either by retaining the N strongest paths or the first N paths or, if necessary, a compromise between the two.

After synchronisation has been carried out, and with synchronisation being achieved, step 101 is followed by a mono-path receiving step 102 during which the selection of the paths may be carried out.

By way of non-limiting example, a particularly advantageous selection process may consist in processing the first path reached, then adding the following paths one by one until taking the supplementary paths into account no longer increases the global signal-to-noise ratio.

When, after the step 102 has been carried out, the mono-path reception is acquired, that is to say, the main paths have been received and the selection of the propagation paths for secondary pulses is also established, the above-mentioned selection can then be used.

In this situation, one of the correlators, correlator $2_2$ of FIG. 4A, then operates in receiving mode, whilst the correlator $1_{12}$ of the acquisition and tracking correlation means $1_1$ operates by means of sliding correlation in order to keep the image of the transmission channel updated. This operation is carried out at step 103 of FIG. 4B, the reception then being carried out in multi-path mode.

It should be appreciated, in particular, that the channel scanning and tracking module allows the appearance or disappearance of propagation paths to be detected, and allows the above mentioned paths to be tracked. The tracking of the paths may be carried out according to the criterion of energy or signal-to-noise ratio mentioned above in the description.

It should thus be appreciated that the channel scanning and tracking module $1_0$ thus allows dynamic processing of the paths to be provided, allows the weighting coefficients to be assigned and modified when they are used and allows the list of paths processed to be changed, the path list signal LT thus being modified for re-updating.

It should be appreciated, under these conditions, that the tracking process employed in this manner with regard to updating the image of the transmission channel allows the objectives of connection quality to be preserved.

The operation 103 is followed by a multi-path receiving operation 104 which consists in updating the selection of the paths, that is to say, the path list LT. The arrow returning from step 104 to step 103 in FIG. 4B illustrates the continuous character of the multi-path reception and, of course, the scanning of the channel and updating of the path list LT.

Ultimately, when the communication is terminated, a return to the initialisation step is again carried out if necessary.

Figure 4B:
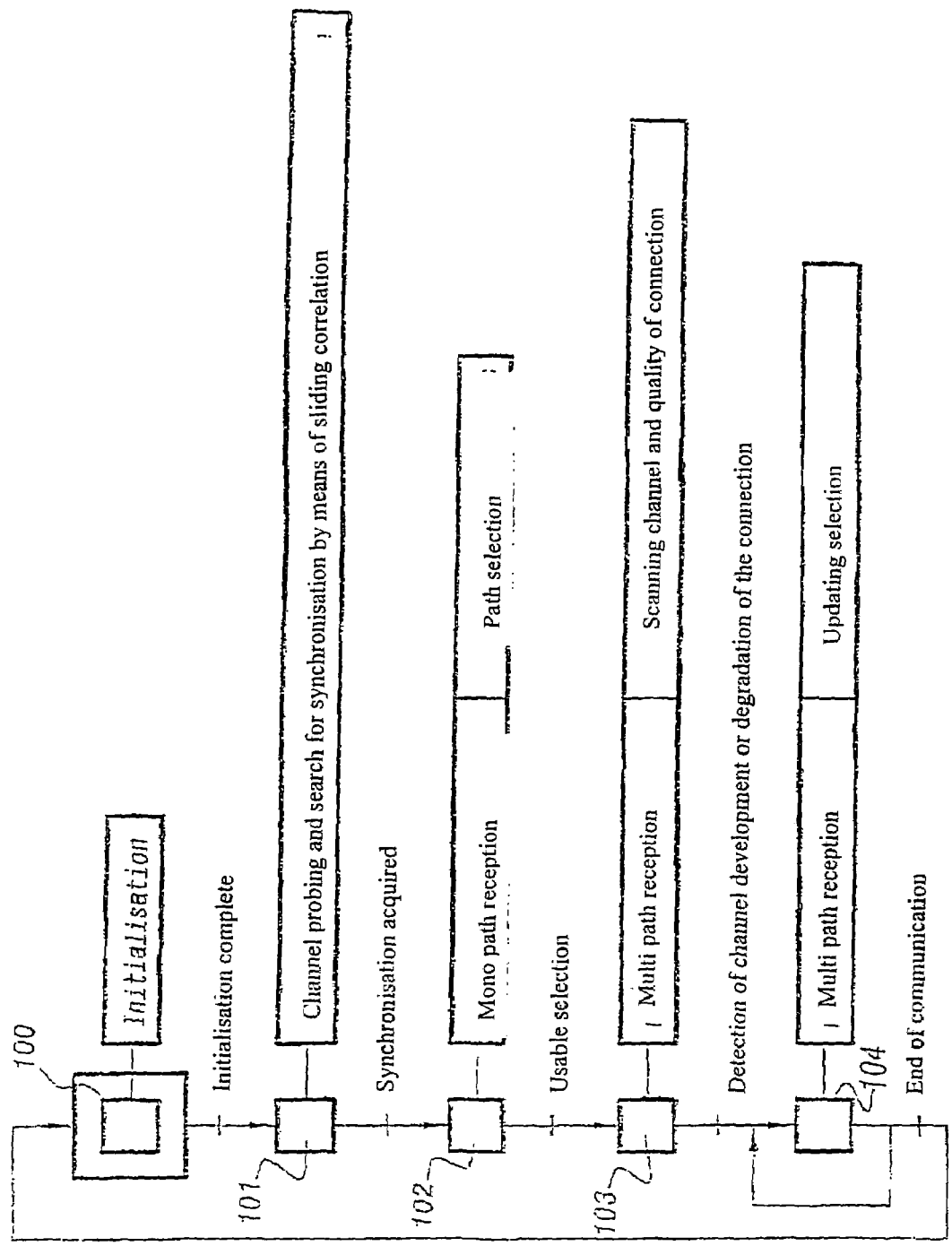
FIG. 4B illustrates, by way of example, a flow chart for carrying out the operation of the system to which the invention relates, as illustrated in FIG. 4A.

With reference to FIG. 4B, it is indicated that, in the case of a rapidly developing transmission channel, that is to say, a channel having great variability, the process for tracking the transmission channel can be accelerated to a large extent by using a plurality of global acquisition correlation means $1_1$, $1_2$ or the like.

In the example of use of a 2-PPM modulation for transmitting UWB pulses and a repetition of three frames per symbol, it may be possible to use a global correlation means for acquisition and tracking by frame and by frame time, for example.

Finally, when weighting of the significance of each of the retained paths selected by the scanning and tracking module $1_0$ is retained, this weighting operation can be implemented at the elemental correlation pattern generator $2_1$ of the single global correlation means 2, it then being possible to apply, to each elemental pattern, at the generator $2_1$ mentioned above, an amplitude which is proportional to the weighting coefficient of the associated path. In this situation, a device for controlling the amplitude of the pattern, illustrated at $2_{1a}$ in the drawing, can be added if necessary.

A method and system for receiving an ultra-wideband signal have thus been described representative of symbols, which is particularly effective in that the number of correlation means may be substantially reduced to two, a single correlation means ensuring the actual reception and a global acquisition correlation means, as described above. Furthermore, the method and system to which the invention relates appear to be particularly advantageous in so far as the number of paths processed is adaptive, the adaptive character resulting from the capacity for selecting and adapting the number of receiving paths processed during operation.

In this manner, a receiver which is in accordance with the subject-matter of the present invention is suitable for modifying its characteristics in a dynamic manner and therefore adapting in an effective manner to the operation conditions dictated by the nature of the parameters, such as the connection quality, constraints of autonomy and variability of the transmission channel. Finally, the number of paths processed is not limited by contingencies of physical implementation, but instead by criteria relating to the value of signal-to-noise ratio or specific energy criteria, for example.

The invention claimed is:

1. Method for receiving an ultra-wideband signal representative of symbols, this signal being transmitted over a transmission channel comprising, over a symbol time, a series of modulated successive direct pulses, each direct pulse being propagated along at least one direct propagation path, and each direct pulse being associated with a plurality of separate successive secondary pulses which are each propagated along a secondary propagation path, that method comprising:
   receiving the series of modulated successive direct pulses and the plurality of secondary pulses associated with each of the modulated successive direct pulses being received on the same receiving circuit,
   producing a composite correlation pattern which is constituted by a series of elemental correlation patterns comprising first elemental correlation pattern which is associated with each direct pulse and successive elemental correlation patterns which are each associated with a successive secondary pulse,
   calculating the value of a global intercorrelation coefficient, which allows a global correlation value to be obtained for the symbol, the calculating comprising
   i) calculation of the elemental intercorrelation coefficient between each elemental intercorrelation pattern and the direct pulse or secondary pulse associated with each of elemental intercorrelation patterns, and
   ii) integration, over the symbol time, of the group of elemental intercorrelation coefficient values in order to transmit the global intercorrelation coefficient value which represents the global correlation value of the symbol.

2. Method according to claim 1, wherein the successive elemental correlation patterns are staggered over time relative to the first elemental correlation pattern by the difference in propagation time between the propagation time of the direct pulse over the direct propagation path and the propagation time of the associated secondary pulse which is propagated over the corresponding secondary propagation path.

3. Method according to claim 2, wherein the step which consists in calculating the value of the global intercorrelation coefficient comprises:
   calculation of the elemental intercorrelation coefficient between each elemental intercorrelation pattern and the direct pulse associated with the plurality of secondary pulses;
   integration, over the symbol time, of the group of elemental intercorrelation coefficient values in order to transmit the global intercorrelation coefficient value which represents the global correlation value of the symbol.

4. Method according to claim 1, wherein, for a countable group of pulses, direct pulse and secondary pulses, which are propagated over a direct path or secondary path of a plurality of secondary propagation paths, the method consists in retaining the first N paths, the first N paths comprising the direct path which corresponds to the shortest propagation time for the associated modulated pulse, and N−1 secondary paths which each correspond to a propagation time for a secondary pulse which is successively increasing.

5. Method according to claim 4, wherein the number N of retained paths is adapted either in accordance with a selection criterion of the first N paths or in accordance with a selection criterion of the N paths which correspond to a maximum amplitude of the direct pulse and the secondary pulses in accordance with the propagation conditions, which allows the quality of the connection via ultra-wideband signal to be optimised.

6. Method according to claim 1, wherein, for a countable group of pulses, direct pulse and secondary pulses, which are propagated over a direct path or secondary path of a plurality of secondary propagation paths, the method consists in retaining N paths for which the amplitude of the direct pulse and secondary pulses is at a maximum.

7. Method according to claim 6, wherein the number N of retained paths is adapted either in accordance with a selection criterion of the first N paths or in accordance with a selection criterion of the N paths which correspond to a maximum amplitude of the direct pulse and the secondary pulses in accordance with the propagation conditions, which allows the quality of the connection via ultra-wideband signal to be optimised.

8. Method according to claim 1, wherein the step which consists in producing a composite correlation pattern consists in:
   establishing, by means of correlation over at least one symbol time, an image of the transmission channel in terms of direct pulse or secondary pulses, of the propagation time and the difference in propagation time between the direct pulse and successive secondary pulses,
   updating, by means of sliding correlation, the image of the transmission channel in order to update the appearance and disappearance of secondary propagation paths and/or the direct propagation path, and to establish, over at least one symbol time, the composite correlation pattern as an updated image of the transmission channel.

9. Method according to claim 1, wherein the step which consists in calculating the value of the global intercorrelation coefficient comprises:
   calculation of the elemental intercorrelation coefficient between each elemental intercorrelation pattern and the direct pulse associated with the plurality of secondary pulses;
   integration, over the symbol time, of the group of elemental intercorrelation coefficient values in order to transmit the global intercorrelation coefficient value which represents the global correlation value of the symbol.

10. Method according to claim 1, wherein,
    a correlator receives the series of successive pulse from the common receiving circuits, and
    said correlator transits the elemental correlation values.

11. System for receiving an ultra-wideband signal representative of symbols, this signal which is transmitted over a transmission channel comprising, over a symbol time, a series of modulated successive direct pulses, each modulated pulse being propagated along at least one direct propagation path, with which series a plurality of separate successive secondary pulses are associated which are each propagated along a secondary propagation path, characterised in that it comprises at least:

common means for receiving the series of modulated successive pulses and the plurality of secondary pulses associated with each of the modulated successive direct pulses, and, connected to the common receiving means, a means for acquiring and updating, over at least one symbol time, an image of the transmission channel, in terms of direct pulse or secondary pulses, of the propagation time and the difference in propagation time between the direct pulse and successive secondary pulses, the acquisition and updating means allowing, by means of sliding correlation, the appearance and the disappearance of secondary propagation paths and/or the principal propagation path to be updated and, over at least one symbol time, a composite correlation pattern to be established which is constituted by a series of successive elemental correlation patterns which are each associated with a direct pulse and a plurality of successive secondary pulses, the acquisition and updating means allowing a path list signal to be transmitted representing the image of the transmission channel;

a single correlation means which receives the path list signal for direct and secondary propagation paths and which allows the value to be calculated for a global intercorrelation coefficient, which allows a global correlation value to be obtained for the symbol, the calculation of the global intercorrelation coefficient comprising i) calculation of the elemental intercorrelation coefficient between each elemental intercorrelation pattern and the direct pulse or secondary pulse associated with each of elemental intercorrelation patterns, and ii) integration, over the symbol time, of the group of elemental intercorrelation coefficient values in order to transmit the global intercorrelation coefficient value which represents the global correlation value of the symbol.

12. System according to claim 11, wherein each successive elemental correlation pattern is staggered over time relative to the first elemental correlation pattern associated with each direct pulse, by the difference in propagation time between the propagation time of the direct pulse over the direct propagation path and the propagation time of the associated secondary pulse which is propagated over the corresponding secondary propagation path.

13. System according to claim 12, wherein the single correlation means comprises at least:
an elemental correlation pattern generator and,
a module associated with the elemental correlation pattern generator for weighting at least one of the elemental correlation patterns which constitute the composite correlation pattern.

14. System according to claim 12, wherein the acquisition and updating means comprises:
at least one global acquisition and tracking correlation means which receives the series of successive pulses from the common receiving means and which transmits a global acquisition correlation coefficient value;
a channel scanning and tracking module which receives at least the global acquisition correlation coefficient value and the global correlation coefficient value and which transmits, on the one hand, the path list signal for direct and secondary propagation paths and, on the other hand, a synchronisation signal to the global acquisition and tracking correlation means.

15. System according to claim 14, wherein the single correlation means comprises at least:
an elemental correlation pattern generator and,
a module associated with the elemental correlation pattern generator for weighting at least one of the elemental correlation patterns which constitute the composite correlation pattern.

16. System according to claim 14, wherein the global acquisition and tracking correlation means comprises:
a correlator which receives the series of successive pulses received and a summing integrator which transmits the acquisition correlation coefficient value;
an elemental synchronisation pattern generator which receives the synchronisation signal and which transmits an acquisition correlation pattern to the correlator, the synchronisation signal consisting in a series of successive elemental correlation pattern times which allows the path list signal to be updated for the following symbol time by means of sliding correlation based on the global correlation coefficient value transmitted by the single correlation means for the preceding symbol time, in accordance with the appearance and disappearance of direct and secondary propagation paths in accordance with the variability of the transmission channel.

17. System according to claim 14, wherein the path list signal transmitted by the channel scanning and tracking module is formed by the composite correlation times with the series of successive pulses received, for which the global intercorrelation coefficient value transmitted by the single correlation means is at a maximum.

18. System according to claim 14, further comprising a plurality of global acquisition and tracking correlation means which receive the series of successive pulses received, each global acquisition and tracking correlation means being associated with an elemental synchronisation pattern generator, the assembly formed by a global acquisition and tracking correlation means and by the elemental pattern generator associated therewith receiving a specific correlation time list signal transmitted by the channel scanning and tracking module, the specific correlation time list signals corresponding to segments of time which are staggered, which allows a series of successive elemental correlation patterns to be produced by means of successive complementary time segments by means of sliding correlation and the acquisition time for the image of the transmission channel to be substantially divided by the number of global acquisition and tracking correlation means which constitute the plurality of global acquisition and tracking correlation means.

19. System according to claim 11, wherein the single correlation means comprises at least:
an elemental correlation pattern generator, and,
a module associated with the elemental correlation pattern generator, for weighting at least one of the elemental correlation patterns which constitute the composite correlation pattern.

20. System according to claim 11, wherein the single correlation means comprises a correlator, which correlator receives the series of successive pulse from the common receiving circuits and transits the elemental correlation values.

* * * * *